United States Patent [19]  [11]  4,142,647
Walters  [45]  Mar. 6, 1979

[54] FUEL TANK VENTING SYSTEM
[75] Inventor: Leslie K. Walters, Rochester, Mich.
[73] Assignee: General Motors Corporation, Detroit, Mich.
[21] Appl. No.: 860,956
[22] Filed: Dec. 15, 1977
[51] Int. Cl.² .................... B65D 25/00; F16K 24/04
[52] U.S. Cl. ............................. 220/85.8; 137/587; 220/85 VS; 220/86 R
[58] Field of Search ................ 220/371, 373, 86 R, 220/85 VR, 85 VS, 85 S; 137/587; 141/285, 286, 291, 292, 293

[56] References Cited
U.S. PATENT DOCUMENTS

| 2,095,460 | 10/1937 | Swords | 220/371 X |
|---|---|---|---|
| 3,133,564 | 5/1964 | Hunter | 220/86 R X |
| 3,187,935 | 6/1965 | Lense | 220/86 R |
| 3,643,690 | 2/1972 | Sarai | 220/86 R X |
| 3,752,135 | 8/1973 | Peterson et al. | 220/85 VR X |
| 3,768,498 | 10/1973 | Urban | 137/43 |
| 3,854,911 | 12/1974 | Walker | 220/85 US X |
| 3,907,153 | 9/1975 | Mutty | 220/86 R |
| 3,911,977 | 10/1975 | Berger | 220/86 R X |
| 3,942,564 | 3/1976 | Nakazato | 220/86 R X |
| 3,968,896 | 7/1976 | Giacoletti et al. | 220/85 R |
| 4,034,784 | 7/1977 | Ball et al. | 220/86 R X |

Primary Examiner—William Price
Assistant Examiner—Allan N. Shoap
Attorney, Agent, or Firm—Arthur N. Krein

[57] ABSTRACT

A fuel tank venting system includes a restricted vent pipe extending from the dome of the fuel tank to a side of the tank filler neck adjacent its open end, a fill limiter vent conduit extending from the opposite side of the filler neck to the upper end of the fuel tank next adjacent the filler neck connection thereto and a second restricted vent pipe extending from the upper filler neck end adjacent its open end for connection to a fuel vapor storage canister or similar device.

2 Claims, 4 Drawing Figures

FUEL TANK VENTING SYSTEM

This invention relates to a fuel vapor venting system and, in particular, to a vehicle fuel tank venting system.

FIELD OF THE INVENTION

Various fuel tank venting systems, as part of an evaporative emission control system, are presently used on vehicles so to prevent fuel vapors emitted from fuel in the vehicle supply from being discharged to the atmosphere. A common form of such fuel tank venting systems utilize a sealed fuel tank connected by a fuel vapor vent line to a vapor storage canister containing for example, charcoal or other carbon material, for absorbing fuel vapors for storage in the canister until such time as these vapors are then purged from the canister for consumption within the vehicle engine. However, one possible problem in such prior art fuel tank venting systems is that, in certain systems, depending on the attitude of the vehicle and therefore of the fuel tank, liquid fuel can flow to the vapor storage canister and thus over-loading the canister, with then possible break-out of fuel vapor from the canister to the atmosphere.

SUMMARY OF THE INVENTION

It is therefore the primary object of this invention to provide a fuel tank venting system that includes means for restricting flow of liquid fuel from a fuel tank to a vapor storage canister.

Another object of this invention is to provide an improved fuel tank venting system wherein fuel tank vapors are first directed to the tank filler neck and then form this filler neck via a restricted vent pipe to a vapor storage canister.

These and other objects of the invention are obtained in a fuel tank venting system by venting the fuel tank to the upper end of the tank filler neck, connecting this end of the filler neck by a parallel fill limiter vent to the fuel tank and by a vapor dome vent connection on the filler neck, having a vent restricted passage therein, that is connected by a second vent line to the vapor storage canister of the system.

For a better understanding of the invention as well as other objects and features thereof, reference is had to the following detailed description of the invention to be read in connection with the accompanying drawings.

DESCRIPTION OF THE PREFERRED EMBODIMENT

Figure 1:
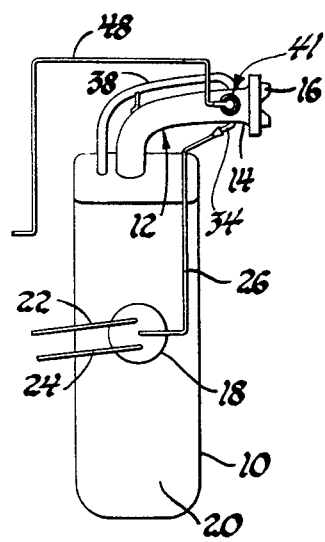
FIG. 1 is a schematic plan view of the fuel tank portion of a vehicle fuel tank venting system in accordance with the invention.

Referring first to FIG. 1, a portion of a fuel tank venting system in accordance with the invention is shown that includes a domed fuel tank 10 having a filler pipe or neck 12 extending therefrom, the filler neck 12 having an upper open end 14 normally closed by a conventional removable multiple seal cap assembly or filler cap 16. In the construction illustrated, the filler pipe or neck 12, of L-shape in plan view, has one end connected to what would be the rear end of the fuel tank, in the construction illustrated, with its opposite or upper open end 14 extending right-ward from the fuel tank, with reference to FIG. 1, it being apparent that, if desired, the filler neck could be constructed to have the opposite side orientation.

A dome and meter unit 18 is centrally positioned on the upper wall 20 of the fuel tank 10 and carries the usual fuel feed line 22 through which fuel is delivered from the tank to the vehicle engine, not shown, and, a return line 24 through which fuel vapor entrained in liquid fuel is returned to the fuel tank 10. A vent line 26 extends from the dome and meter unit 18, which may be formed so as to be utilized as a liquid-vapor separator with a restricted vapor passage therein, not shown, in a manner disclosed, for example, in U.S. Pat. No. 3,752,135 entitled Vehicle Fuel Tank Venting System, issued Aug. 14, 1973 to Donald W. Peterson and Floyd A. Wyczalek, the disclosure of which is incorporated herein by reference thereto.

Figure 4:
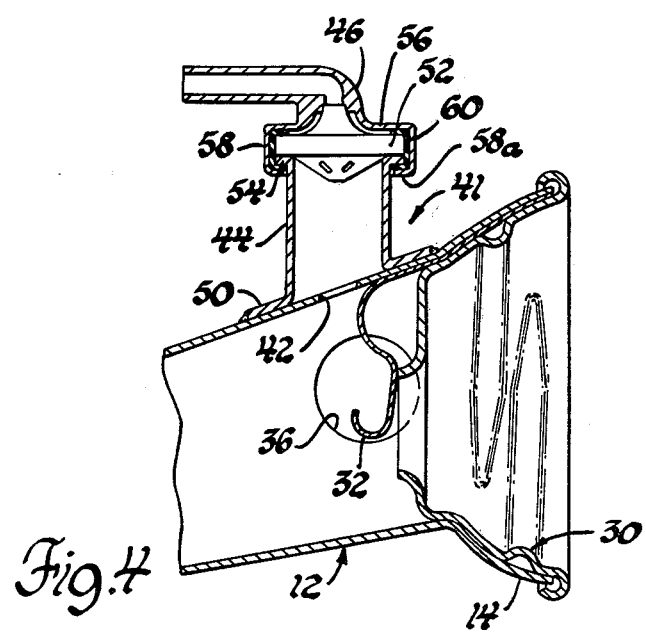
FIG. 4 is a view similar to a portion of FIG. 3 but with parts broken away to show in section the internal details of the fuel tank filler neck and details of the vapor dome vent structure and elements incorporated therein.

Referring briefly now to FIG. 4, the interior of the filler neck 12, next adjacent its open end 14, has incorporated therein a nozzle restraint mechanism, generally designated 30, with a spring like deflector 32 incorporated therein, that is operative so as to limit the size type fuel filler nozzle that can be inserted therein for refilling the fuel tank with fuel. The nozzle restraint mechanism 30 shown is of the type disclosed in U.S. Pat. No. 4,034,784, entitled Filler Neck to Inhibit Use of Leaded Fuel, issued July 12, 1977 to Frank W. Ball and Paul R. Mutty, the disclosure of which is incorporated herein by reference thereto.

Figure 2:
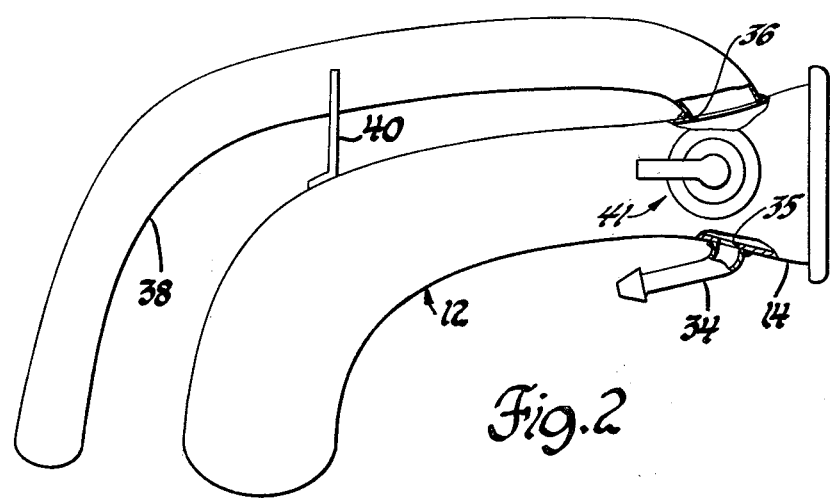
FIG. 2 is an enlarged plan view of the fuel tank filler neck shown in FIG. 1; but with the gas or seal cap removed.
Figure 3:
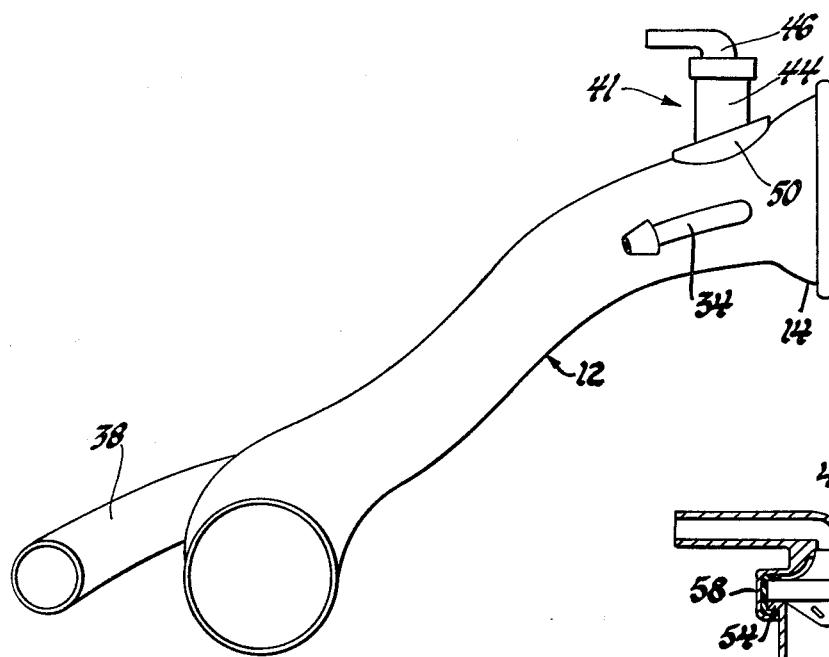
FIG. 3 is a side view of the fuel tank filler neck of FIG. 2.

In accordance with the invention, the opposite end of the vent line 26 is connected to the upper end of the filler neck 12, next adjacent its upper open end 14, by means of a vent hose coupling 34, shown in detail in FIGS. 2 and 3, that is secured, as by brazing or welding, to encircle a side vent port 35 provided in the side wall of the filler neck 12, whereby fuel vapor will flow from the fuel tank 10 into the interior of the filler neck 12 on the fuel tank 10 side of the nozzle restraint mechanism 30 within the filler neck, that is, these fuel vapors will flow to the downstream side of the nozzle restraint mechanism 30 relative to fuel flow path during filling of the fuel tank with liquid fuel, the left side with reference to FIG. 4.

This interior area of the filler neck 12 directly downstream of the nozzle restraint mechanism 30 is also connected via a side port 36, shown as being located diametrically opposite vent hose coupling 34, and a fill limiter pipe 38 to the fuel tank 10, this fill limiter pipe 38 being suitably fixed at one end to the filler neck 12 so as to encircle the side port 36, and is suitably connected at its opposite end to the upper apertured end of fuel tank 10 at a location adjacent to the connection of the filler neck 12 to the fuel tank so as to provide for flow communication with the upper interior portion of the fuel tank. In the construction illustrated, the filler neck 12 and fill limiter pipe 38 are structurally interconnected in parallel by a support bracket 40 welded, for example, to these elements.

Venting of the above described interior area of the filler neck 12 and therefore of the fuel tank 10 is effected by means of a vent passage means, generally designated 41, that includes a vent opening or hole 42 provided in the upper wall portion of the filler neck which is adapted for communication with the usual vapor storage canister, not shown, of an otherwise conventional evaporative emission control system. The vent passage means 41 further includes a conduit housing 44 and a vent line hose coupling 46, the latter being used to effect the actual connection to the vapor storage canister, not shown, as by a vent hose 48 interconnecting these elements.

In the construction shown, the conduit housing 44, which is of cylindrical configuration, has a radial flange 50 at one end or lower end thereof which is positioned to encircle the vent hole 42, and which is fixed, as by welding, to the filler neck. A suitable liquid check valve 52, to prevent liquid flow through the vent passage means to the vapor storage canister, not shown, is supported between the upper radial flange 54 of the conduit housing and an internal lower radial wall 56 of the coupling 46, the conduit housing 44 and coupling 46 being suitably secured together, as by having the lower rim 58 of the coupling 46 rolled over the upper flange 54 as at 58a. An annular seal 60 of C-shaped cross-section, and made, for example, of rubber, has an upper radial flange thereof which is sandwiched between the radial wall 56 and the check valve 52 and an opposite or lower radial flange which is sandwiched between the upper flange 54 and the rolled over lower rim 58a.

Liquid check valve 52 is not shown in detail, since the details of this type check valve are not deemed necessary for an understanding of the subject invention and, since such liquid check valves, which permit vapor flow in one direction but are operative should the fuel tank be inverted so as to obstruct flow of liquid fuel into the vent line, are well known in the art to which the subject application is related. As an example, the liquid check valve 52 may be of the type disclosed in U.S. Pat. No. 3,968,896, entitled Fuel Tank, issued July 13, 1976 to John B. Giacoletti, Thomas C. Ryding and Walter C. Zetye, the disclosure of which is incorporated herein by reference thereto.

From the above description of the structural details of the subject fuel tank venting system it will now be apparent that this system in operation would effectively prevent liquid fuel, such as gasoline, stored in the fuel tank 10 from entering the vapor storage canister of the evaporative emission control system of a vehicle, regardless of the attitude of the vehicle.

The embodiments of the invention in which an exclusive property or privilege is claimed are defined as follows:

1. A fuel tank venting apparatus for a fuel tank including a tank body having a domed upper surface defining a vapor space above the level of liquid fuel in the tank body and a filler neck extending upward from the tank body and having an open end and a fuel nozzle restrictor means recessed in and extending thereacross next adjacent the open end, the open end of the filler neck being adapted to be closed by a removable filler cap, said venting apparatus including a vapor conduit means connected in flow communication at one end with the vapor space in the tank body adjacent the domed upper surface and at its opposite end to a side of the filler neck next adjacent to the fuel nozzle restrictor means and between the fuel nozzle restrictor means and the fuel tank, aperture means in the upper end of the filler neck defining an orifice for venting fuel vapor from the upper portion of the filler neck adjacent to said fuel nozzle restrictor, conduit housing means operatively connected in flow communication with said aperture means and having an outlet end adapted to be connected to a vapor storage canister, a liquid check valve means supported in said conduit housing means to prevent liquid flow through said conduit housing means, and a filler limiter vent conduit connected at an end to said tank body and connected at its other end to the side of the filler neck opposite said vapor conduit means connection to the filler neck.

2. A fuel tank venting apparatus for a fuel tank having a tank body with a domed upper surface defining a vapor space above the normal level of liquid fuel in the tank body and a filler neck extending upward from the tank body providing an open end with a fuel nozzle restrictor recessed into and extending across the filler neck next adjacent the open end, the open end of the filler neck being adapted to be closed by a removable filler cap, said venting apparatus including a vapor conduit means connected at one end to the tank body for flow communication with the vapor space therein, the opposite end of said vapor conduit means being connected in flow communication to the filler neck next adjacent to said fuel nozzle restrictor, a fill limiter means connected in flow communication at one end to said filler neck adjacent to said opposite end of said vapor conduit means and at its opposite end to said tank body next adjacent to the connection of said filler neck thereto, aperture means in the upper end of the filler neck defining an orifice for venting fuel vapor from the upper portion of the filler neck adjacent to said fuel nozzle restrictor, conduit housing means operatively connected in flow communication with said aperture means and having an outlet end adapted to be connected to a vapor storage canister, and a liquid check valve means supported in said conduit housing means for preventing liquid flow through said conduit housing means.

* * * * *